(12) United States Patent
Hendriksen et al.

(10) Patent No.: US 11,691,998 B2
(45) Date of Patent: Jul. 4, 2023

(54) 1,2-PHENYLENE BRIDGED 1-INDENYL-2-INDENYL METALLOCENE COMPLEXES FOR OLEFIN POLYMERISATION

(71) Applicant: SABIC GLOBAL TECHNOLOGIES B.V., Bergen op Zoom (NL)

(72) Inventors: Coen Hendriksen, Geleen (NL); Nicolaas Hendrika Friederichs, Brunssum (NL); Alexander Z. Voskoboynikov, Moscow (RU); Antonio Vittoria, Avella (IT); Vincenzo Busico, Naples (IT); Roberta Cipullo, Naples (IT); Dmitry Y. Mladentsev, Moscow (RU); Bogdan A. Guzeev, Moscow (RU); Dmitry V. Uborsky, Moscow (RU)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/985,254

(22) Filed: Nov. 11, 2022

(65) Prior Publication Data

US 2023/0086874 A1    Mar. 23, 2023

Related U.S. Application Data

(62) Division of application No. 16/963,709, filed as application No. PCT/EP2019/051654 on Jan. 23, 2019.

(30) Foreign Application Priority Data

Jan. 24, 2018   (EP) .................................... 18153200

(51) Int. Cl.
| | | |
|---|---|---|
| C07F 17/00 | (2006.01) | |
| C08F 4/6592 | (2006.01) | |
| C08F 210/16 | (2006.01) | |
| C08F 4/76 | (2006.01) | |
| C08F 10/02 | (2006.01) | |

(52) U.S. Cl.
CPC .......... *C07F 17/00* (2013.01); *C08F 4/65927* (2013.01); *C08F 4/76* (2013.01); *C08F 10/02* (2013.01); *C08F 210/16* (2013.01)

(58) Field of Classification Search
CPC ..... C07F 17/00; C08F 4/65927; C08F 210/16
See application file for complete search history.

(56) References Cited

U.S. PATENT DOCUMENTS

| 5,071,808 A | 12/1991 | Antberg et al. |
| 6,342,622 B1 | 1/2002 | Arts et al. |
| 6,800,706 B1 | 10/2004 | Kanamaru et al. |
| 2014/0107270 A1 | 4/2014 | Fellahi |
| 2020/0115478 A1 | 4/2020 | Friederichs et al. |
| 2021/0115080 A1 | 4/2021 | Friederichs et al. |

FOREIGN PATENT DOCUMENTS

| EP | 2698251 A1 | 2/2014 |
| WO | 9411406 A1 | 5/1994 |
| WO | 0029415 A1 | 5/2000 |
| WO | 2014099307 A1 | 6/2014 |
| WO | 2015065681 A1 | 5/2015 |

OTHER PUBLICATIONS

Friederichs et al., "A combined experimental-molecular modeling apporach for ethene-propene copolymerization with C2-symmetric metallocense", Journal of Molecular Catalysis A: Chemical 242 (2005) p. 91-104.
International Search Report for International Application No. PCT/EP2019/051654, International Filing Date Jan. 23, 2019, dated Feb. 21, 2019, 5 pages.
Journal of Organometallic Chemistry, 2004, vol. 689, p. 1965-1977 (Alt et al).
Lewkebandara, et al., Adducts of titanium tetrachloride with organosulfur compounds. Crystal and molecular structures of TiCl4(C4H8S)2 and (TiCl4)2(CH3SSCH3), Polyhedron, 1998, vol. 17, No. 1, pp. 1-9.
McDaniel et al in Macromolecules 2010 (43) p. 8836-8852.
Peacock Andrew J., "Handbook of Polyethylene", Chapters Production Processes, 2000, Marcel Dekker, Inc., New York; ISBN 0824795466; p. 43-66.

(Continued)

Primary Examiner — Caixia Lu
(74) Attorney, Agent, or Firm — Cantor Colburn LLP

(57) ABSTRACT

The invention relates to a metallocene complex according to formula (I), (I) wherein $R_1$ and $R_2$ are independently selected from H, an alkyl or an aryl group, wherein $R_3$ is a C1-C10 alkyl group, wherein R' is selected from H, an alkyl group, an aryl group and wherein different R' substituents can be connected to form a ring structure and wherein B is a 1,2 phenylene bridging moiety, which can be optionally substituted, wherein Mt is selected from Ti, Zr and Hf, X is an anionic ligand, z is the number of X groups and equals the valence of Mt minus 2. The invention also relates to a catalyst comprising the reaction product of the metallocene complex and a cocatalyst. Further the invention relates to a (co)polymerisation process of olefinic monomers.

12 Claims, No Drawings

(56) References Cited

OTHER PUBLICATIONS

Randall et al. "A Review of High Resolution Liquid Carbon Nuclear Magnetic Resonance Characterizations of Ethylene-Based Polymers", Journal of Macromolecular Science—Reviews in Macromolecular Chem & Phys, C29 vol. 2 & 3, 1989, 16 pages.
Rudin, "Practical Aspects of Molecular Weight Measurements" Modern Methods of Polymer Characterization, John Wiley & Sons, New York (1991) pp. 103-112.
Sassmannshausen, Chemistry of Half-Sandwich Compounds of Zirconium: Evidence for the Formation of the Novel ansa Cationic-Zwitterionic Complex [Zr(n:n-C5H4CMe2C6H4Me-p)(u-MeB(CbF5)3)]+[MeB(C6F5)3], Organometallics, 2000, vol. 19, pp. 482-489.
Schaverien et al., "Ethylene Bis(2-indenyl) Zirconocenes: A New Class of Diastereomeric Metallocenes for the (Co) Polymerization of alpha-Olefins", Organometallics, vol. 20, No. 16, 2001, 17 pages.
Seenivasan, et al., "Spectroscopic Investigation of Heterogeneous Ziegler-Natta Catalysts: Ti and Mg Chloride Tetrahydrofuranates, Their Interaction Compound, and the Role of the Activator", Chemistry—a European Journal, 2011, vol. 17, pp. 8648-8656.
Waymouth et al., "Investigation of Bridge and 2-Phenyl Substituent Effects on Ethylene/ a-Olefin Copolymerization Behavior with 1,2'-Bridged Bis(indenyl)zirconium Dichlorides", Macromolecules 2004, 37, 2342-2347.
Written Opinion for International Application No. PCT/EP2019/051654, International Filing Date Jan. 23, 2019, dated Feb. 21, 2019, 6 pages.
Zimm et al.; "The Dimensions of Chain Molecules Containing Branches and Rings"; J. Chem. Phys. 17; 1949; pp. 1301-1314.

1,2-PHENYLENE BRIDGED 1-INDENYL-2-INDENYL METALLOCENE COMPLEXES FOR OLEFIN POLYMERISATION

CROSS REFERENCE TO RELATED APPLICATIONS

This application is a divisional application of U.S. application Ser. No. 16/963,709, filed Jul. 21, 2020, which is a National Stage application of PCT/EP2019/051654, filed Jan. 23, 2019, which claims the benefit of European Application No. 18153200.3, filed Jan. 24, 2018, all of which are incorporated by reference in their entirety herein.

The invention relates to substituted 1,2-phenylene bridged 1-indenyl 2-indenyl metallocene complexes, a catalyst comprising the substituted metallocene complex, a process for the preparation of olefin polymers in the presence of substituted metallocene complexes, the use of the olefin polymers for making articles and articles comprising an olefin polymer.

Metallocene complexes together with a cocatalyst form catalysts that are widely used for olefin polymerisation. In general, the metallocene complexes are known to have only one active polymerisation center and are often referred to as single site catalysts or discrete catalysts to distinguish them from non-single site catalysts like for instance Ziegler-type catalysts. The presence of one active center is believed to result in polymers having a narrow molecular weight distribution (MWD) and narrow compositional distribution for copolymers of different olefins. An advantage of metallocene catalysts is their high activity and well defined structures compared to traditional Ziegler-Natta catalysts. A further advantage of metallocene catalysts over conventional Ziegler-type catalysts is that the former can display a higher reactivity towards alpha-olefins, which is especially beneficial in copolymerisations of ethylene with such alpha-olefins. Catalysts with a high reactivity towards alpha-olefins require less alpha-olefin during the polymerisation in order to reach a desired alpha-olefin content in the final polymer, which is an advantage in the commercial preparation of copolymers of ethylene with alpha-olefins.

It is well known in the art that the reactivity of alpha-olefins compared to ethylene decreases upon increasing the size of the alpha-olefin. For instance, the reactivity decreases from propylene>1-butene>1-hexene>1-octene, as has been published for example by Krentsel et al in Polymers and Copolymers of Higher alpha-Olefins, Carl Hanser Verlag, München 1997 and by McDaniel et al in Macromolecules 2010 (43) page 8836-8852. Therefore, especially when copolymerising ethylene with higher alpha-olefins like 1-hexene, catalysts are needed that display a high reactivity towards such alpha-olefins.

An additional complication arises in the preparation of copolymers of ethylene and alpha-olefins, which is related to the general observation that the average molecular weight of the obtained copolymers tends to decrease upon increasing alpha-olefin content, which for example has been published by Friederichs, Wang, Budzelaar and Coussens in Journal of Molecular Catalysis A: Chemical 242 (2005) page 91-104. The combination of high comonomer reactivity as well as high molecular weight is a challenging target for developing commercially applicable metallocene catalysts.

Numerous patent applications are known describing metallocene catalysts. For example, WO2014/099307 describes metallocene catalysts for the polymerisation of ethylene to branched polyethylene using a catalyst containing the metallocene system dimethylsilylene(2,3,4,5-tetramethyl-1-cyclopentadienyl)(3-phenyl-1-indenyl)zirconium dichloride. EP0372414 discloses a metallocene catalyst with an ethylene bridged 1-indenyl 2-indenyl zirconium complex. WO94/11406 discloses 2-indenyl complexes for olefin polymerisation. WO2015/065681 describes a 1-indenyl bridged catalyst system. Macromolecules 2004, 37, 2342-2347 (Reybuck and Waymouth) describes an investigation of bridge and 2-phenyl substituent effects on ethylene-alfa olefin copolymerisation behavior with dimethylsilyl bridged bis 1-indenyl/2-indenyl zirconium complexes.

Metallocenes bearing 2-indenyl ligands are known in the art. For example, U.S. Pat. No. 6,342,622 (SABIC/DSM) describes 2-indenyl containing bridged metallocenes, in which the bridge contains an sp2 hybridized carbon. Organometallics, Vol. 20, No. 16, 2001 (Schaverien et al) describes 1,2 ethylene bridged bis-2-indenyl zirconocenes. These metallocene catalysts result in polymers having a low molecular weight. Journal of Organometallic Chemistry, 2004, vol 689, pg 1965-1977 (Alt et al) describes 1,2-naphthylidene bridged metallocenes. In this publication it is stated that 1,2-naphthylidene bridged metallocenes containing a fluorenyl and a 2-indenyl ligand result in lower molecular weight polyethylene compared to its fluorenyl/1-indenyl or fluorenyl/cyclopentadienyl containing analogues. WO0029415 (Montell) describes methylene bridged bis-2-indenyl zirconocenes, which also give polymers having a low molecular weight.

Despite all efforts, there is a need for a highly active catalyst, which is able to produce polyolefins in a high yield, having a high reactivity for alpha olefin incorporation (like for example copolymerisation of ethylene with 1-hexene) and which is still giving high molecular weight polymers.

A new family of metallocene complexes has now been discovered which advantageously can be used for olefin polymerisation, preferably for ethylene copolymerisation, and which gives at least one advantage of a higher catalyst activity, a higher 1-hexene incorporation and/or a high molecular weight polymer.

SUMMARY OF THE INVENTION

The invention relates to a metallocene complex according to formula I,

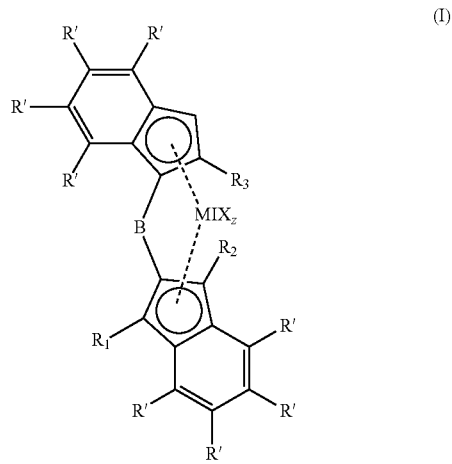

wherein $R_1$ and $R_2$ are independently selected from H, an alkyl or an aryl group, wherein $R_3$ is a C1-C10 alkyl group, wherein R' is selected from H, an alkyl group, an aryl group and wherein different R' substituents can be connected to form a ring structure and wherein B is a 1,2 phenylene bridging moiety, which can be optionally substituted, wherein Mt is selected from Ti, Zr and Hf, X is an anionic ligand, z is the number of X groups and equals the valence of Mt minus 2. For example, X may be a halogenide, an alkoxide, an alkyl group, an aryl group or an aralkyl group.

The metallocene complex according to the invention surprisingly can copolymerise ethylene with alpha olefins in a high yield with a very high 1-hexene reactivity and a very high molecular weight. This copolymerisation can take place in the presence of a cocatalyst and under suitable polymerisation conditions.

DETAILED DESCRIPTION

The metallocene complex according to the present invention has the general structure according to formula I:

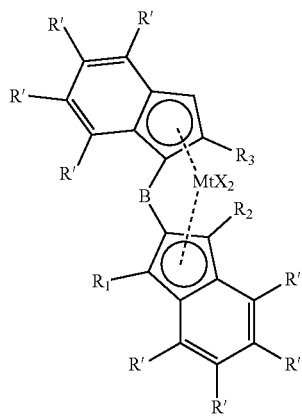

(I)

wherein $R_1$ and $R_2$ are independently selected from H, an alkyl or an aryl group, wherein $R_3$ is a C1-C10 alkyl group, wherein R' is selected from H, an alkyl group, an aryl group and wherein different R' substituents can be connected to form a ring structure and wherein B is a 1,2 phenylene bridging moiety, which can be optionally substituted wherein Mt is selected from Ti, Zr and Hf, X is an anionic ligand, z is the number of X groups and equals the valence of Mt minus 2.

$R_1$ and $R_2$ are preferably independently selected from H, a C1-C10 alkyl group or a C6-C10 aryl group. Examples of suitable alkyl groups are methyl, ethyl, n-propyl, iso-propyl, butyl, pentyl, hexyl, octyl, decyl and the like. Examples of suitable aryl groups are substituted or unsubstituted phenyl and naphthyl groups, preferably phenyl groups, or 3,5-dimethyl-1-phenyl, 3,5-diethyl-1-phenyl, 3,5-diisopropyl-1-phenyl or 3,5-ditertiairbutyl-1-phenybenzyl. More preferably, $R_1$ and $R_2$ are chosen from H, a methyl, ethyl, n-propyl or iso-propyl group, a butyl group, a hexyl or cyclohexyl group, or a phenyl group. Most preferably, $R_1$ and $R_2$ are chosen from H, methyl or phenyl groups $R_3$ is preferably a C1-C4 alkyl group, more preferably a methyl, ethyl, n-propyl or iso-propyl group, most preferably selected from a methyl or isopropyl group.

Preferably Mt is zirconium or hafnium, most preferably Mt is zirconium.

Preferably X is a monovalent anionic group, selected from the group consisting of halogen (F, Cl, Br or I), a C1-C20 hydrocarbyl group or a C1-C20 alkoxy group. Preferably X is a methyl group, Cl, Br or I, most preferably methyl or Cl.

The metallocene complex according to formula (I) comprises a 2-substituted 1-indenyl group which is bridged through a 1,2-phenylene bridge to a 2-indenyl group, which 2-indenyl group can be substituted with one or more substituents on the 1 and 3 position. Both 1-indenyl and 2-indenyl ligands can be further substituted on the 6 membered indenyl ring with alkyl or aryl substituents.

The 1,2 phenylene bridge can be substituted on the 3, 4, 5 or 6 position with alkyl or aryl groups. The bridge can also be a naphthylene group, a phenanthrylene or any other aromatic group, as long as the bridge is being formed by two adjacent carbon atoms in the aromatic bridge. Preferably the bridge is a 1,2 phenylene bridge as shown in structure (II). In the context of the present invention, the 1,2 phenylene bridge may be a bridging moiety comprising a phenylene group that is bound to a 1-indenyl ligand or a first of either the 1 or 2 position of the phenylene group, and to a 2-indenyl ligand at the other of the 1 or 2 position of the phenylene group, wherein further the phenylene group may be substituted on the 3,4,5 or 6 position with alkyl or aryl groups.

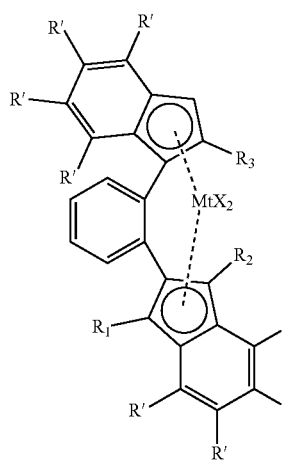

(II)

The Support

The metallocene complex can be immobilized on a support. The support is preferably an inert support, more preferably a porous inert support. Examples of porous inert supports materials are talc, clay and inorganic oxides. Preferably, the support material is in a finely divided form.

Suitable inorganic oxide materials include group 2A, 3A, 4A and 4B metal oxides such as silica, alumina and mixtures thereof. Other inorganic oxides that may be employed either alone or in combination with the silica or alumina are magnesia, titania, zirconia and the like. Other support materials, however, can be employed, for example finely divided functionalized polyolefins such as finely divided polyethylene or polystyrene.

Preferably, the support is a silica having a surface area between 200 and 900 m$^2$/g and a pore volume between 0.5 and 4 ml/g.

The Catalyst

The invention is also directed to a catalyst prepared from the metallocene complex according to the invention and a cocatalyst. The cocatalyst should be capable to generate a cationic specie from the metallocene compound and form a so-called non- or weakly coordinating anion. Suitable cocatalysts include aluminium- or boron-containing cocatalysts.

Suitable aluminium-containing cocatalysts comprise aluminoxanes, alkyl aluminium compounds and aluminium-alkyl-chlorides. The aluminoxanes usable according to the present invention are well known and preferably comprise oligomeric linear and/or cyclic or cage-like alkyl aluminoxanes represented by the formula: $R^3$—$(AlR^3$—$O)_n$—$AlR^3{}_2$ for oligomeric, linear aluminoxanes and $(—AlR^3—O—)_m$ for oligomeric, cyclic aluminoxanes; wherein n is 1-40, preferably n is 10-30; m is 3-40, preferably m is 3-30 and $R^3$ is a $C_1$ to $C_8$ alkyl group and preferably a methyl group. Further other organoaluminum compounds can be used such as trimethylaluminium, triethylaluminium, triisopropylaluminium, tri-n-propylaluminium, triisobutylaluminium, tri-n-butylaluminium, tri-tert-butylaluminium, triamylaluminium; dimethylaluminium ethoxide, diethylaluminium ethoxide, diisopropylaluminum ethoxide, di-n-propylaluminium ethoxide, diisobutylaluminium ethoxide and di-n-butylaluminium ethoxide; dimethylaluminium hydride, diethylaluminium hydride, diisopropylaluminum hydride, di-n-propylaluminium hydride, diisobutylaluminium hydride and di-n-butylaluminium hydride.

Suitable boron-containing cocatalysts include trialkylboranes, for example trimethylborane or triethylborane and/or perfluoroarylborane and/or perfluoroarylborate-compounds.

In the process to produce olefin polymers by polymerising one or more olefins in the presence of a metallocene complex preferably an organoaluminum cocatalyst is present.

More preferably, methylaluminoxane, trialkylboranes, perfluoroarylboranes or perfluoroarylborates are used as the cocatalyst.

Olefin Polymerisation

In another aspect, the invention relates to a process for the preparation of olefin polymers by polymerising one or more olefins in the presence of a cocatalyst and the metallocene complex of the invention, wherein the metallocene complex optionally is immobilized on a support.

The process to produce the olefin polymers may start with the reaction of the metallocene complex according to the invention with the cocatalyst. This reaction can be performed in the same vessel as the reaction vessel wherein the olefin polymers are produced or in a separate vessel, whereafter the mixture of the metallocene complex and the catalyst is fed to the reaction vessel. During the reaction described above an inert solvent can be used.

The polymerisation, can be adequately carried out in a slurry process, a solution process or a gas-phase process.

In the mixture of the metallocene complex and an organoaluminum cocatalyst, the cocatalyst is used in an amount of 10 to 100,000 mol, preferably from 10 to 10,000 mol per mol of the transition metal compound.

In the mixture of the metallocene complex and an organoborane or organoborate cocatalyst, the cocatalyst is used in an amount of 0.1 to 100 mol, preferably from 0.5 to 100 mol per mol of the transition metal compound.

The solvent used in a slurry process to produce olefin polymers may be any organic solvent usually used for the polymerisation. Examples of solvents are benzene, toluene, xylene, propane, butane, pentane, hexane, heptane, cyclohexane and methylene chloride. Also the olefin to be polymerised can be used as the solvent.

In the polymerisation process, an additional compound can be used as a scavenger compound to scrub undesirable impurities from the polymerisation medium that can adversely affect the catalyst productivity. Examples of such undesired impurities are oxygen, water, alcohols and the like. Suitable scavenging agents are metal alkyl compounds, such as aluminium alkyl, magnesium alkyl, or zinc alkyl compounds. The aluminium alkyl compound for the purpose of scavenging the impurities can also be an aluminoxane compound. Also partially pacified aluminium alkyl compounds can be used. For instance, the reaction product of an aluminium alkyl with a sterically hindered phenol can be used.

In the process to produce olefin polymers the polymerisation conditions, like for example temperature, time, pressure, monomer concentration can be chosen within wide limits. The polymerisation temperature is in the range from −100 to 300° C., preferably 0 to 240° C., more preferably 50 to 200° C. The polymerisation time is in the range of from 10 seconds to 20 hours, preferably from 1 minute to 10 hours, more preferably from 5 minutes to 5 hours. The ethylene pressure during polymerisation is in the range from 1 to 3500 bar, preferably from 1 to 2500 bar, more preferably from 1 to 1000 bar, even more preferably from 1 to 500 bar, most preferably from 1 to 100 bar. The molecular weight of the polymer can be controlled by use of hydrogen in the polymerisation. The polymerisation may be conducted by a batch process, a semi-continuous process or a continuous process and may also be conducted in two or more steps of different polymerisation conditions. The polyolefin produced is separated from the polymerisation solvent and dried by methods known to a person skilled in the art.

In the process to produce olefin polymers the olefin which is polymerised can be one type of olefin or can be mixtures of different olefins. The polymerisation thus includes homopolymerisation and copolymerisation. Examples of olefins are α-olefins such as ethylene, propylene, 1-butene, 1-pentene, 3-methyl-1-butene, 4-methyl-1-pentene, 3-methyl-1-pentene, 1-hexene, 1-octene, 1-nonene, 1-decene; conjugated and non-conjugated dienes such as butadiene, 1,4-hexadiene, 5-ethylidene-2-norbornene, dicyclopentadiene, 4-methyl-1,4-hexadiene and 7-methyl-1,6-octadiene; cyclic olefins such as cyclobutene and other olefinic compounds such as isobutene, vinyl-cyclohexane and styrene but is not limited thereto.

Preferably, at least one of the olefins that is polymerised is ethylene. More preferably, a mixture of ethylene and at least one other α-olefin of 3 or more carbon atoms is polymerised.

Preferably, the other olefin of 3 or more carbon atoms is chosen from 1-butene, 1-hexene, 1-octene, vinyl-cyclohexane or 4-methyl-1-pentene.

Preferably, the olefin comonomer is present in an amount of about 5 to about 50 percent by weight in the ethylene-olefin copolymer, more preferably an amount of from about 7 to about 40 percent by weight in the ethylene α-olefin copolymer.

For example, a linear low density polyethylene (LLDPE) having a melt mass flow rate (also known as melt flow index) as determined using ASTM D1238-10 (190° C./2.16 kg) which ranges from 0.5 to 125 g/10 min and a density in the range from 900 kg/m³ to less than 940 kg/m³ as determined using ASTM D1505-10 may be obtained. For example, the density of the LLDPE ranges from about 915 kg/m³ to less than 940 kg/m³, for example between 915 and 925 kg/m³. For example, the melt flow index of the LLDPE ranges from 0.3 to 3 g/10 min, for example from 0.5 to 1.5 g/10 min.

The polymerisation may be performed via a gas-phase process, via a slurry process or via a solution process. The production processes of polyethylene are summarised in "Handbook of Polyethylene" by Andrew Peacock (2000; Dekker; ISBN 0824795466) at pages 43-66.

The various processes may be divided into solution polymerisation processes employing homogeneous (soluble) catalysts and processes employing supported (heterogeneous) catalysts. The latter processes include both slurry and gas phase processes.

When carrying out a slurry or gas phase process, a so-called continuity agent or antistatic agent or anti-fouling agent may be added to reactor.

The invention is also directed to a polyolefin, for example polyethylene, preferably high density polyethylene (HDPE) obtainable or obtained by the process of the invention, for example by copolymerising ethylene and at least one other olefin in the presence of a metallocene complex according to the invention or a composition, wherein the metallocene complex according to the invention is immobilized on a support.

As defined herein, in linear low density polyethylene, the term "linear" means that the polymer is substantially linear, but may contain some long chain branching.

"Long chain branching" (LCB) means a chain length longer than the short chain branch that results from the incorporation of the α-olefin(s) into the polymer backbone. Each long chain branch will have the same comonomer distribution as the polymer backbones and can be as long as the polymer backbone to which it is attached.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPC-DV). In addition, melt-rheology, for example determining the behavior of the polymer melt under different shear rates, is frequently used to indicate the presence of long chain branching. The use of these techniques for long chain branch detection and the underlying theories have been well documented in the literature.

See, for example, Zimm, G. H. and Stockmayer, W. H., J. Chem. Phys., 17,1301 (1949) and Rudin, A., Modern Methods of Polymer Characterization, John Wiley & Sons, New York (1991 pp. 103-112).

It has been found that with the metallocene complex of the invention or with the composition of the invention wherein the metallocene complex of the invention is present on a support, it is possible to produce polyethylene from ethylene and at least one other olefin, for example an olefin having up to 8 carbon atoms, with a high incorporation of the at least one other olefin.

The amount of incorporation of the at least one other olefin, for example an α-olefin in the polyethylene is expressed by the amount of branches per 1000 carbon atoms.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2 & 3, p. 285-297).

Therefore, the invention also relates to a polyolefin, preferably polyethylene, for example linear low density polyethylene (LLDPE). The low density polyethylene, for example LLDPE, preferably has an amount of branches per 1000 carbon atoms as determined using $^{13}C$ NMR of at least 18, for example of at least 19, for example at least 20 and/or for example at most 50, for example at most 40, for example at most 30, for example at most 25.

The number average molecular weight (Mn) of the polyolefin, for example polyethylene, for example LLDPE of the invention may vary between wide ranges and may for example be in the range from 1000 to 200000 Da.

For example, the Mn of the polyolefin of the invention may be at least 1500, for example at least 2000, for example at least 20,000, for example at least 50,000 and/or for example at most 150,000, for example at most 110,000, for example at most 100,000, for example at most 70,000 Da.

The weight average molecular weight (Mw) of the polyolefin, for example polyethylene, for example LLDPE of the invention may also vary between wide ranges and may for example be in the range from 1500 to 500000. For example, the Mw of the polyolefin of the invention may be at least 2500, for example at least 10,000, for example at least 50,000, for example at least 100,000 and/or for example at most 400,000, for example at least 350,000, for example at most 300,000, for example at most 250,000.

For purpose of the invention, the Mw and Mn are determined using SEC (Size Exclusion Chromatography) using 1,2,4-trichlorobenzene or o-dichlorobenzene as an eluent, and calibrated using linear polyethylene or polystyrene standards.

The molecular weight distribution (that is Mw/Mn) of the polyolefin of the invention may for example vary from 2 to 5, from 2.1 to 4 or from 2.5 to 3.5.

The polyolefin obtained or obtainable by the process of the invention may be mixed with suitable additives.

Examples of suitable additives for polyethylene include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

The polyolefins of the invention and compositions comprising said polyolefins may suitably be used for the manufacture of articles. For example, the polyolefins and compositions of the invention may be manufactured into film, for example by compounding, extrusion, film blowing or casting or other methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets.

Therefore, in another aspect, the invention also relates to articles comprising the polyolefins obtainable by the process of the invention.

In yet another aspect, the invention also relates to use of the polyolefins obtainable by the process of the invention for the preparation of articles, for example for the preparation of films.

In yet another aspect, the invention relates to a process for the preparation of articles using the polyolefin according to the invention.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will hereafter be elucidated by way of the following examples, without being limited thereto.

EXAMPLES

General Considerations

All manipulations were carried out under an atmosphere of dry, $O_2$-free $N_2$ employing an Innovative Technology glove box and a Schlenk vacuum-line. Tetrahydrofuran (THF), toluene, methylene chloride, hexane and pentane were purified with a Grubbs-type column system manufactured by Innovative Technology and dispensed into thick-walled Schlenk glass flasks equipped with Teflon-valve stopcocks. Pyridine was dried over the appropriate agents and distilled into the same kind of storage flasks. Anhydrous benzene (Alfa, 99.8%, packaged under argon) was purchased and used as received. Deuterated solvents were dried over the appropriate agents, vacuum-transferred into storage flasks with Teflon stopcocks and degassed accordingly ($CDCl_3$, $C_6D_6$ and $CD_2Cl_2$). $^1H$, $^{11}B$, $^{13}C$ and $^{31}P$ NMR spectra were recorded at 25° C. Bruker 400 MHz spectrometers. Chemical shifts are given relative to $SiMe_4$ and referenced to the residue solvent signal ($^1H$, $^{13}C$). $^{11}B$ and $^{31}P$ resonances were referenced externally to ($BF_3 \cdot Et_2O$) and 85% $H_3PO_4$, respectively. Chemical shifts are reported in ppm and coupling constants as scalar values in Hz. $ZrCl_4(Me_2S)_2$, $^1TiCl_4(THF)_2{}^2$ and $TiCl_4(Me_2S)_2{}^3$ were prepared as reported in, respectively, Sassmannshausen, *J. Organometallics* 2000, 19, 482-489; Seenivasan, K.; Sommazzi, A.; Bonino, F.; Bordiga, S.; Groppo, E. *Chemistry-a European Journal* 2011, 17, 8648-8656 and Suren Lewkebandara, T.; McKarns, P. J.; Haggerty, B. S.; Yap, G. P. A.; Rheingold, A. L.; Winter, C. H. *Polyhedron* 1998, 17, 1-9. $ZrCl_4(THF)_2$ (Strem) was purchased and used as received.

Synthesis of Ligands and Catalyst Precursors

Preparation of Catalyst ID 135

(2E)-3-(2-bromophenyl)-1-phenylprop-2-en-1-one

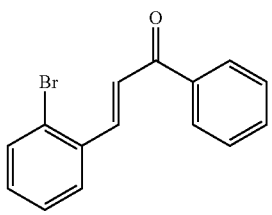 [SMILES: O=C(/C=C/c1ccccc1Br)c1ccccc1]

A mixture of 36.05 g (300 mmol) of 1-phenylethanone and 55.51 g (300 mmol) of 2-bromobenzaldehyde was added dropwise to a solution of 15 g of NaOH in a mixture of 90 ml of 95% EtOH and 140 ml of water. The resulting mixture was stirred for 12 h at r.t., then, diluted with 1500 ml of water and extracted with 3×250 ml of dichloromethane. The combined extract was dried over $K_2CO_3$, passed through a short pad of silica gel 60 (40-63 um) and evaporated to dryness. The residue was distilled in vacuum (b.p.195-205° C./6 mm Hg) to afford 65.38 g (76%) of (2E)-3-(2-bromophenyl)-1-phenylprop-2-en-1-one.

$^1H$ NMR (400 MHz, $CDCl_3$): δ 8.15 (d, J=15.7 Hz, 1H), 8.07-7.99 (m, 2H), 7.73 (dd, J=7.7 Hz, J=1.6 Hz, 1H), 7.64-7.55 (m, 2H), 7.55-7.47 (m, 2H), 7.44 (d, J=15.7 Hz, 1H), 7.35 (tm, J=7.6 Hz, 1H), 7.23 (td, J=7.7 Hz, J=1.6 Hz, 1H).

3-(2-Bromophenyl)indan-1-one

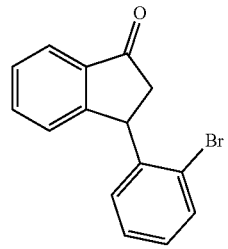 [SMILES: O=C1CC(c2ccccc2Br)c2ccccc21]

To polyphosphoric acid (prepared from 660 g of $P_4O_{10}$ and 540 g of 85% $H_3PO_4$) 65.38 g (227.7 mmol) of (2E)-3-(2-bromophenyl)-1-phenylprop-2-en-1-one were added at 140° C. and the resulting mixture was stirred at this temperature for 0.5 h. Then, it was poured onto 2 kg of ice. The product was extracted with 4×300 ml of dichloromethane. The combined extract was washed with aqueous solution of $K_2CO_3$, dried over $K_2CO_3$, passed through a short pad of silica gel 60 (40-63 um) and evaporated to dryness. The residue was purified by column chromatography on silica gel 60 (40-63 um; eluent: hexanes/dichloromethane=5:1, vol., then dichloromethane/EtOAc=3:1, vol.). This procedure gave 28.01 g (43%) of 3-(2-bromophenyl)indan-1-one as a white solid.

$^1H$ NMR (400 MHz, $CDCl_3$): δ 7.84 (d, J=7.7 Hz, 1H), 7.68-7.59 (m, 2H), 7.47 (t, J=7.7 Hz, 1H), 7.38 (d, J=7.7 Hz, 1H), 7.19 (t, J=7.3 Hz, 1H), 7.12 (t, J=7.3 Hz, 1H), 6.79 (d, J=7.3 Hz, 1H), 5.14 (dd, J=8.3 Hz, J=3.3 Hz, 1H), 3.35 (dd, J=19.4 Hz, J=8.3 Hz, 1H), 2.53 (dd, J=19.4 Hz, J=3.3 Hz, 1H).

1-(2-Bromophenyl)-3-methoxyindane

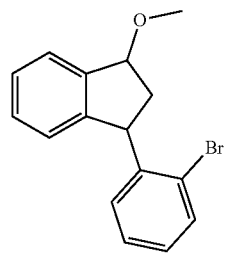 [SMILES: COC1CC(c2ccccc2Br)c2ccccc21]

To a mixture of 47.2 g (164.37 mmol) of 3-(2-bromophenyl)indan-1-one and 7.0 g (185.0 mmol) of $NaBH_4$ in 160 ml of THF 80 ml of methanol were added dropwise for 5 h at 5° C. This mixture was stirred overnight at r.t. and then evaporated to dryness. The residue was partitioned between 500 ml of dichloromethane and 500 ml of 1 M HCl. The organic layer was separated, and the aqueous layer was additionally extracted with 250 ml of dichloromethane. The combined organic extract was dried over $Na_2SO_4$ and evaporated to dryness to give a white mass. To a solution of thus obtained 3-(2-bromophenyl)indan-1-ol in 450 ml of DMSO 55 g (0.98 mol) of KOH and 53 g (0.373 mol) of MeI were added. This mixture was stirred for 5 h at ambient temperature. The formed solution was decanted from an excess of KOH, the latter was additionally washed with 3×150 ml of dichloromethane. The combined organic solution was washed with 2000 ml of water. The organic layer was separated, and the aqueous layer was extracted with 2×100 ml of dichloromethane. The combined organic extract was washed with 7×1000 ml of water, dried over $Na_2SO_4$, and then evaporated to dryness. The residue was purified by column chromatography on silica gel 60 (40-63 um; eluent: hexanes/dichloromethane=2:1, vol., then 1:3, vol.). This procedure gave 48.97 g (98%) of 1-(2-bromophenyl)-3-methoxyindane as a white solid.

$^1$H NMR (400 MHz, $CDCl_3$): δ 7.58 (d, J=7.9 Hz, 1H), 7.48 (d, J=7.1 Hz, 1H), 7.34-7.22 (m, 2H), 7.19 (t, J=7.4 Hz, 1H), 7.12-7.00 (m, 3H), 4.92 (t, J=6.5 Hz, 1H), 4.77 (t, J=8.0 Hz, 1H), 3.47 (s, 3H), 3.10-2.98 (m, 1H), 1.95-1.84 (m, 1H).

2-[2-(3-Methoxy-2,3-dihydro-1H-inden-1-yl)phenyl]-4,4,5,5-tetramethyl-1,3,2-dioxaborolane

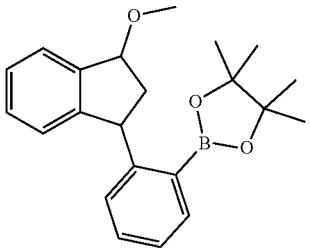 [SMILES: COC1CC(c2ccccc2B2OC(C)(C)C(C)(C)O2)c2ccccc21]

To a solution of 36.54 g (120.52 mmol) of 1-(2-bromophenyl)-3-methoxyindane in 350 ml of THF 48.2 ml (120.5 mmol) of 2.5 M n-butyllithium in hexanes were added dropwise at −50° C. over 0.5 h. This mixture was stirred for 0.5 h at −50° C., then the resulting solution was cooled to −78° C., and 19.0 g (182.9 mmol) of trimethyl borate was added in one portion. The reaction mixture was stirred overnight at r.t., then it was quenched by addition of 200 ml of 2N hydrochloric acid. The resulting mixture was stirred for 0.5 h, then extracted with 2×500 ml of ether. The combined extract was evaporated and dried in vacuum to give yellowish oil. To the solution of this oil in 150 ml of THF 14.0 g (118.5 mmol) of pinacol were added and this mixture was stirred at r.t. overnight, then, additionally for 3 h at reflux. After evaporation, the crude product was purified by column chromatography on silica gel 60 (40-63 um; eluent: hexanes/dichloromethane=1:1, vol., then 1:5, vol.). This procedure gave 22.46 g (53%) of 2-[2-(3-methoxy-2,3-dihydro-1H-inden-1-yl)phenyl]-4,4,5,5-tetramethyl-1,3,2-dioxaborolane as a white solid.

$^1$H NMR (400 MHz, $CDCl_3$): δ 7.82 (dd, J=7.5 Hz, J=1.2 Hz, 1H), 7.46 (d, J=7.1 Hz, 1H), 7.33 (td, J=7.5 Hz, J=1.4 Hz, 1H), 7.29-7.17 (m, 3H), 7.11 (d, J=7.7 Hz, 1H), 6.99 (d, J=7.1 Hz, 1H), 5.09 (t, J=8.2 Hz, 1H), 4.94 (t, J=6.8 Hz, 1H), 3.48 (s, 3H), 3.00 (ddd, J=12.8 Hz, J=8.2 Hz, J=7.1 Hz, 1H), 1.93 (ddd, J=12.8 Hz, J=8.3 Hz, J=6.8 Hz, 1H), 1.35 (s, 6H), 1.34 (s, 6H).

2-(1H-Inden-2-yl)-2'-(3-methoxy-2,3-dihydro-1H-inden-1-yl)biphenyl

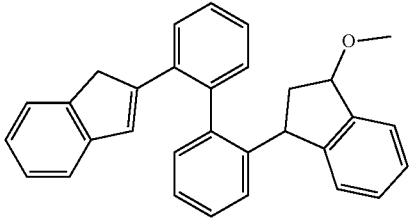 [SMILES: COC1CC(c2ccccc2-c2ccccc2C2=Cc3ccccc3C2)c2ccccc21]

A mixture of 9.14 g (26.1 mmol) of 2-[2-(3-methoxy-2,3-dihydro-1H-inden-1-yl)phenyl]-4,4,5,5-tetramethyl-1,3,2-dioxaborolane, 7.08 g (26.1 mmol) of 2-(2-bromophenyl)-1H-indene, 7.5 g (70.8 mmol) of $Na_2CO_3$, 500 mg (0.98 mmol, 3.75 mol. %) of $Pd(P^tBu_3)_2$, 40 ml of water and 110 ml of 1,2-dimethoxyethane (DME) was refluxed for 6 h. DME was evaporated on a rotary evaporator, and 200 ml of water and 400 ml of dichloromethane were then added to the residue. The organic layer was separated, and the aqueous layer was additionally extracted with 50 ml of dichloromethane. The combined extract was dried over $K_2CO_3$ and then evaporated to dryness to give a dark-red solid. The crude product was purified by flash chromatography on silica gel 60 (40-63 um, hexane/dichloromethane=2:1, vol., then, 1:2, vol.) to give 8.58 g (79%) of 2-(1H-inden-2-yl)-2'-(3-methoxy-2,3-dihydro-1H-inden-1-yl)biphenyl as a yellowish oil which completely solidified at r.t.

$^1$H NMR (400 MHz, $CDCl_3$): δ 7.62 (d, J=7.7 Hz) and 7.56 (dd, J=7.5 Hz, J=1.2 Hz) {sum 1H}, 7.50-6.80 (m, 15H), 6.47 (s) and 6.39 (d, J=7.5 Hz) {sum 1H}, 4.71 (t, J=7.1 Hz) and 4.67 (t, J=6.9 Hz) {sum 1H}, 4.13 (t, J=8.3 Hz) and 4.01 (t, J=8.5 Hz) {sum 1H}, 3.54-3.28 (2s and m, 5H), 2.73-2.54 (m) and 2.51-2.46 (m) {sum 1H}, 1.81-1.70 (m, 1H).

2-(1H-Inden-2-yl)-2'-(1H-inden-3-yl)biphenyl (L135)

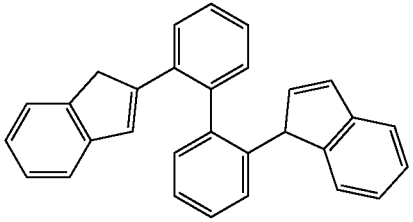 [SMILES: C1=CC(c2ccccc2-c2ccccc2C2=Cc3ccccc3C2)c2ccccc21]

To a solution of 8.58 g (20.7 mmol) of 2-(1H-inden-2-yl)-2'-(3-methoxy-2,3-dihydro-1H-inden-1-yl)biphenyl in 250 ml of toluene 150 mg of TsOH was added, and this mixture was refluxed with Dean-Stark head for 15 min and then cooled to r.t. The resulting solution was washed with 10% aqueous $Na_2CO_3$. The organic layer was separated and the aqueous layer was extracted with 2×100 ml of dichloromethane. The combined organic solution was dried over $K_2CO_3$ and then passed through a short pad of silica gel 60 (40-63 um). The silica gel pad was additionally washed with 50 ml of dichloromethane. The filtrate was evaporated almost to dryness and the residue was dissolved in 100 ml of n-hexane. Yellowish powder precipitated from this solution over 1.5 hours at r.t. was filtered to give 6.22 g (79%) of 2-(1H-inden-2-yl)-2'-(1H-inden-3-yl)biphenyl as a mixture of isomers.

¹H NMR (400 MHz, CDCl₃): δ 7.95-7.65 (m, 13.5H), 7.05 and 7.04 (2s, sum 1H), 6.91 (t, J=7.3 Hz, 0.45H), 6.68 (dd, J=5.5 Hz, J=2.2 Hz) and 6.66 (dd, J=5.5 Hz, J=1.7 Hz) {sum 1H}, 6.59 (d, J=7.3 Hz, 0.45H), 6.54 and 6.53 (2s, sum 1H), 6.45 (s, 0.55H), 6.32 (dd, J=5.5 Hz, J=1.8 Hz) and 5.95 (dd, J=5.5 Hz, J=1.6 Hz) {sum 1H}, 4.51 and 4.50 (2s, sum 1H), 3.60-3.34 (m, 2H).

Catalyst ID 135

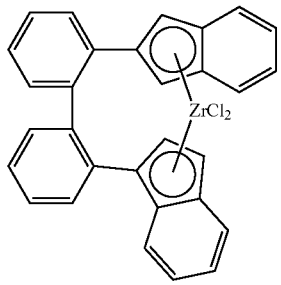

To a white suspension of 6.18 g (16.16 mmol) of 2,2'-(1H-inden-2-yl)(1H-inden-3-yl)biphenyl (L135) in 200 ml of ether 13.0 ml (31.6 mmol) of 2.43 M n-butyllithium in hexanes were added in one portion at −50° C. This mixture was stirred overnight at r.t., then the resulting yellow solution with a lot of yellow precipitate was cooled to −50° C., and 3.77 g (16.18 mmol) of ZrCl₄ was added. The reaction mixture was stirred overnight at r.t. to give orange solution with orange precipitate. This mixture was evaporated to dryness. The residue was heated with 200 ml of toluene, and the suspension formed was filtered while hot through glass frit (G4). 280 mg (3.2%) of the title compound were separated from the resulting filtrate by fractional crystallization.

¹H NMR (400 MHz, CDCl₃): δ 7.98-7.93 (m, 1H), 7.90 (d, J=8.5 Hz, 1H), 7.87 (d, J=8.5 Hz, 1H), 7.62-7.45 (m, 7H), 7.33-7.08 (m, 5H), 7.04 (d, J=3.7 Hz, 2H), 6.65 (d, J=3.7 Hz, 1H), 6.34 (d, J=2.4 Hz, 1H), 5.75 (d, J=3.7 Hz, 1H).

Preparation of Catalyst ID's 140, 157, 158, 179, and 182

3-(2-Bromophenyl)-2-methyl-1-phenylprop-2-ene-1-one

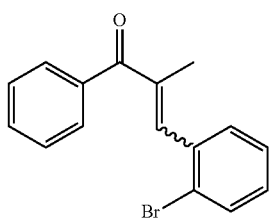 [SMILES: CC(=Cc1ccccc1Br)C(=O)c1ccccc1]

NaOH (11.6 g, 290 mmol, 1.3 equiv.) was dissolved in a mixture of 100 ml of EtOH and 200 ml of water. The solution was cooled to r.t., and propiophenone (30.0 g, 224 mmol, 1 equiv.) was added in one portion. Then, 2-bromobenzaldehyde (41.4 g, 224 mmol, 1 equiv) was added in one portion, and the resulting mixture was stirred at r.t. overnight and then for 12 h at 60° C. The reaction mixture was poured into 1000 ml of water and extracted with diethyl ether (3×150 ml). The combined organic extract was dried over Na₂SO₄, and the solvents were removed in vacuum. The residue was distilled in vacuum, and fraction with b.p. 135-155° C./1 mbar was collected. It contained ca. 5 mol % of propiophenone according to ¹H NMR spectrum. This procedure afforded 45.8 g (66%) of the title compound as greenish oil which was used without further purification.

¹H NMR (400 MHz, CDCl₃): δ 7.88-7.93 (m, 2H), 7.62 (d, 1H, J=8.0 Hz), 7.46-7.59 (m, 3H), 7.33-7.41 (m, 2H), 7.22 (br.s, 1H), 7.19-7.22 (m, 1H), 2.13 (d, 3H, J=1.3 Hz).

3-(2-Bromophenyl)-2-methyl-2,3-dihydro-1H-inden-1-one

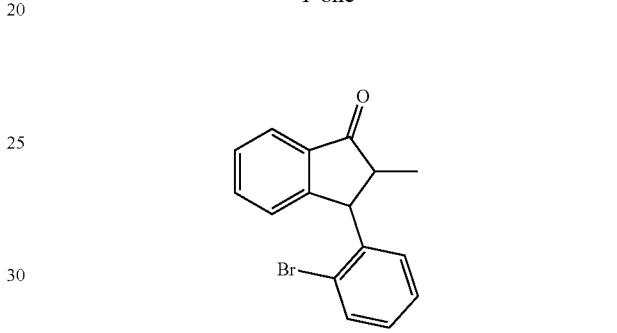

3-(2-Bromophenyl)-2-methyl-1-phenylprop-2-ene-1-one (57.4 g, 190 mmol) was added in one portion to the polyphosphoric acid (prepared from 500 ml of 85% phosphoric acid and 150 g of P₄O₁₀). The mixture was stirred at 140° C. for 1 h, then cooled to ambient temperature, and poured into 3000 ml of water. The crude product was extracted with diethyl ether (3×300 ml). The combined organic extract was dried over Na₂SO₄ and then evaporated to dryness. The remaining propiophenone and all other volatiles were removed in high vacuum using Kugelrohr apparatus. This procedure afforded 34.0 g (59%) of the title compound as red oil. The product was a mixture of two diastereomers, A and B, in molar ratio ~4:1 according to ¹H NMR spectrum.

¹H NMR (400 MHz, CDCl₃): δ (7.83, d, 1H in B, J=7.8 Hz), 7.80 (d, 1H in A, J=7.6 Hz), 7.05-7.65 (m, 6H in A and B), 6.72-6.85 (m, 1H in A), 6.54 (dd, 1H in B, J=7.2 Hz, J=1.9 Hz), 6.54 (dd, 1H in B, J=8.0 Hz), 4.70-4.85 (m, 1H in A), 3.18 (quint, 1H in B, J=7.7 Hz), 2.50-2.75 (m, 1H in B), 1.44 (d, 3H in A, J=7.1 Hz), 0.81 (d, 3H in B, J=7.7 Hz).

1-(2-Bromophenyl)-2-methyl-1H-indene

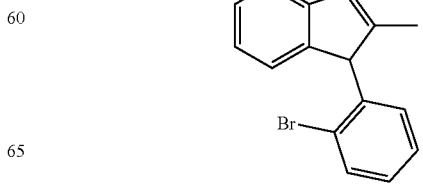

3-(2-Bromophenyl)-2-methyl-2,3-dihydro-1H-inden-1-one (34.0 g, 113 mmol) was dissolved in a mixture of 400 ml of THF and 100 ml of methanol. NaBH₄ (6.40 g, 170 mmol, 1.5 equiv.) was added in small portions to this solution. After completion of addition the reaction mixture was stirred overnight at r.t. and then poured into 1500 ml of water. The product was extracted with diethyl ether (3×100 ml). The combined organic extract was washed with water, dried over Na₂SO₄ and then evaporated to dryness. The residue was dissolved in 500 ml of toluene, and catalytic amount of TsOH was added. The resulting mixture was refluxed using Dean-Stark apparatus for 10 min, then cooled to r.t. and passed through a short pad of silica gel 60 (40-63 um). The solution was evaporated to dryness, the residue was dissolved in hexane, and the solution was passed through a short pad of silica gel. The resulting solution was evaporated to dryness. This procedure afforded 25.0 g (78%) of the title compound as white solid.

¹H NMR (400 MHz, CDCl₃): δ 7.63-7.67 (m, 1H), 7.20-7.29 (m, 3H), 7.01-7.10 (m, 3H), 6.58 (m, 1H), 6.49-6.54 (m, 1H), 5.06 (s, 1H), 1.94 (br.s, 3H).

2-Methyl-1-(2-(3-phenyl-1H-inden-2-yl)phenyl)-1H-indene (L140)

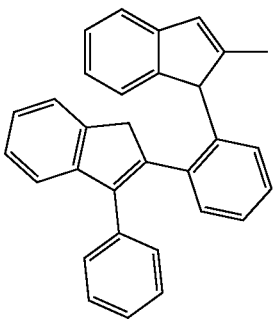 [SMILES: CC1=Cc2ccccc2C1c1ccccc1C1=C(c2ccccc2)c2ccccc2C1]

A mixture of 1-(2-bromophenyl)-2-methyl-1H-indene (3.00 g, 10.5 mmol, 1 equiv.), 4,4,5,5-tetramethyl-2-(3-phenyl-1H-indene-2-yl)-1,3,2-dioxaborolane (4.00 g, 12.6 mmol, 1.2 equiv.), Na₂CO₃ (2.80 g, 26.3 mmol, 2.5 equiv), toluene (25 ml), ethanol (12 ml), and water (5 ml) was placed in a heavy wall glass pressure vessel. Argon was bubbled through the mixture for 5 min, and then Pd(PPh₃)₄ (0.61 g, 0.53 mmol, 0.05 equiv.) was added. The resulting mixture was stirred overnight at 110° C., cooled to r.t., diluted with water, and the crude product was extracted with toluene (2×30 ml). The combined organic extract was washed with water, dried over Na₂SO₄, and then evaporated to dryness. The residue was dissolved in hexane, and the obtained solution was passed through a short pad of silica gel 60 (40-63 urn). The solvent was evaporated, and the residue was recrystallized from hexane. This procedure afforded 2.50 g (60%) of the title compound as an off-white solid.

¹H NMR (400 MHz, CDCl₃): δ 7.58 (d, 1H, J=7.2 Hz), 7.47 (d, 1H, J=7.4 Hz), 7.43 (d, 1H, J=7.5 Hz), 7.21-7.38 (m, 8H), 7.03-7.16 (m, 3H), 6.81 (t, 1H, J=7.3 Hz), 6.38 (s, 1H), 6.33 (d, 1H, J=7.8 Hz), 6.08 (br.s, 1H), 4.46 (s, 1H), 3.91-4.07 (m, 2H), 1.45 (s, 3H).

3-Methyl-1-phenylbutan-1-one

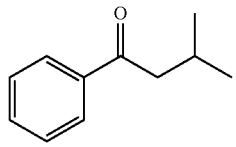

Isovaleroyl chloride (50.0 g, 410 mmol, 1.0 equiv) was added dropwise to the suspension of AlCl₃ (64.0 g, 480 mmol, 1.15 equiv) in dry benzene (330 ml) at 5° C. The cooling bath was removed and the reaction mixture was allowed to warm to r.t. and then stirred for 2 h. Then the reaction mixture was poured onto crushed ice, the organic layer was separated and the aqueous layer was extracted with benzene (2×100 ml). The combined organic extracts were dried over Na₂SO₄ and evaporated to dryness. The residue was distilled and fraction with b.p. 70° C./2 mbar was collected. This procedure gave 52.1 g (78%) of the product as colorless oil.

¹H NMR (400 MHz, CDCl₃): δ 7.93-7.95 (m, 2H), 7.54 (t, 1H, J=7.4 Hz), 7.44 (t, 2H, J=7.5 Hz), 2.82 (d, 2H, J=6.9 Hz), 2.24-2.34 (m, 1H), 0.99 (d, 6H, J=6.7 Hz).

2-((2-Bromophenyl)(hydroxy)methyl)-3-methyl-1-phenylbutan-1-one

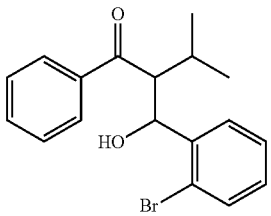 [SMILES: CC(C)C(C(=O)c1ccccc1)C(O)c1ccccc1Br]

n-Butyllithium (48.2 ml, 118 mmol, 1.0 equiv) was added dropwise to a solution of N,N-diisopropylamine (16.6 ml, 118 mmol, 1.0 equiv) in dry THF (400 ml) at −80° C. The resulting mixture was stirred for 15 min. A solution of 3-methyl-1-phenylbutan-1-one (19.2 g, 118 mmol, 1.0 equiv) in dry THF (50 ml) was added dropwise to the mixture at the same temperature. The resulting mixture was stirred for 15 min and a solution of 2-bromobenzaldehyde (21.8 g, 118 mmol, 1.0 equiv) in dry THF (50 ml) was added dropwise. The resulting mixture was stirred for 30 min and the solution of 12 M HCl (10.0 ml, 118 mmol, 1.0 equiv) in 40.0 ml of MeOH was added at −80° C. The reaction mixture was allowed to warm to r.t., stirred for 1 h, and then poured into water. The mixture was extracted with ether (3×100 ml), the combined organic extracts were dried over Na₂SO₄ and evaporated to dryness. All volatiles were removed from the residue under high vacuum using Kugelrohr apparatus to afford the title product (19.8 g, 48%).

¹H NMR (600 MHz, CDCl₃): δ 7.53-7.54 (m, 2H), 7.38-7.41 (m, 2H), 7.25 (t, 2H, J=7.8 Hz), 7.20 (dd, 1H, J=7.8 Hz, J=1.4 Hz), 7.03 (t, 1H, J=7.1 Hz), 6.89 (td, 1H, J=7.6 Hz, J=1.6 Hz), 5.41 (dd, 1H, J=9.4 Hz, J=2.7 Hz), 4.72 (d, 1H, J=9.4 Hz), 3.85 (dd, 1H, J=10.0 Hz, J=2.8 Hz), 2.45-2.51 (m, 1H), 1.30 (d, 3H, J=6.7 Hz), 0.85 (d, 3H, J=6.7 Hz).

2-Benzoyl-1-(2-bromophenyl)-3-methylbutyl methanesulfonate

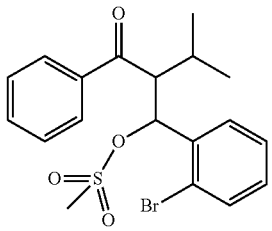 [SMILES: CC(C)C(C(=O)c1ccccc1)C(OS(C)(=O)=O)c1ccccc1Br]

Triethylamine (27.8 g, 275 mmol, 5.0 equiv) was added to a solution of 2-((2-bromophenyl)(hydroxy)methyl)-3-methyl-1-phenylbutan-1-one (19.1 g, 55.0 mmol, 1.0 equiv), in 100 ml of dry THF at 0° C. A solution of methanesulfonyl chloride (7.00 g, 61.0 mmol, 1.1 equiv) in 50 ml of dry THF was added dropwise at the same temperature and the reaction mixture was stirred overnight. The mixture was poured into water and the crude product was extracted with ether (3×100 ml), the combined organic extracts were dried over Na$_2$SO$_4$ and evaporated to dryness. The resulting solid was washed with methanol to afford the title product as white powder (18.0 g, 77%).

$^1$H NMR (400 MHz, CDCl$_3$): δ 7.83 (br.s, 2H), 7.48-7.58 (m, 3H), 7.42 (t, 2H, J=7.4 Hz), 7.29 (t, 1H, J=7.5 Hz), 7.12-7.18 (m, 1H), 6.42 (br.s, 1H), 3.99 (br.s, 1H), 2.87 (s, 3H), 1.94 (br.s, 1H), 0.90 (d, 6H, J=6.5 Hz).

2-(2-Bromobenzylidene)-3-methyl-1-phenylbutan-1-one

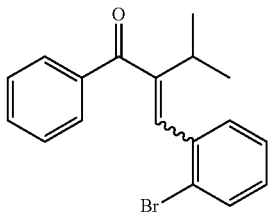 [SMILES: CC(C)C(=Cc1ccccc1Br)C(=O)c1ccccc1]

2-Benzoyl-1-(2-bromophenyl)-3-methylbutyl methanesulfonate (17.4 g, 41.0 mmol, 1.0 equiv) and DBU (25.0 g, 164 mmol, 4.0 equiv.) were mixed in 200 ml of dry THF and the resulting mixture was stirred overnight at 60° C. The mixture was poured into water and the crude product was extracted with ether (3×100 ml), the combined organic extracts were dried over Na$_2$SO$_4$ and evaporated to dryness to afford the title product as yellow oil (13.0 g, 96%).

$^1$H NMR (400 MHz, CDCl$_3$, mixture of 2 isomers): δ 8.02-8.04 (m), 7.76-7.79 (m), 7.63 (d), 7.58 (t), 7.49 (t), 7.34-7.36 (m), 7.14-7.28 (m), 6.76 (s), 2.91-2.99 (m), 1.25-1.28 (m).

3-(2-Bromophenyl)-2-isopropyl-2,3-dihydro-1H-inden-1-one

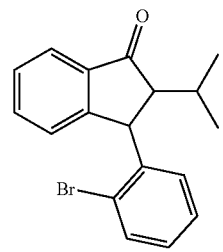 [SMILES: CC(C)C1C(=O)c2ccccc2C1c1ccccc1Br]

2-(2-Bromobenzylidene)-3-methyl-1-phenylbutan-1-one (12.5 g) was added in one portion to polyphosphoric acid (prepared from 150 ml of 85% phosphoric acid and 150 g of P$_4$O$_{10}$). The mixture was stirred at 140° C. for 2 h, then cooled to ambient temperature, and poured into 300 ml of water. The crude product was extracted with diethyl ether (3×200 ml). The combined organic extract was dried over Na$_2$SO$_4$ and then evaporated to dryness. All other volatiles were removed in high vacuum using Kugelrohr apparatus. This procedure afforded 10.4 g (83%) of the title compound as red oil.

$^1$H NMR (400 MHz, CDCl$_3$): δ 7.79 (d, 1H, J=7.7 Hz), 7.63 (d, 1H, J=7.2 Hz), 7.52 (t, 1H, J=6.9 Hz), 7.39 (t, 1H, J=7.4 Hz), 6.84-7.28 (m, 4H), 5.04 (br.s, 1H), 2.77 (br.s, 1H), 2.49-2.57 (m, 1H), 0.99 (d, 6H, J=6.9 Hz).

1-(2-Bromophenyl)-2-isopropyl-1H-indene

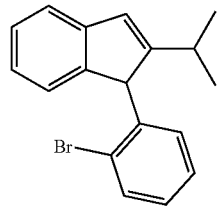 [SMILES: CC(C)C1=Cc2ccccc2C1c1ccccc1Br]

3-(2-Bromophenyl)-2-isopropyl-2,3-dihydro-1H-inden-1-one (3.00 g, 9.00 mmol, 1.0 equiv) was dissolved in a mixture of 20 ml of THF and 7 ml of methanol. NaBH$_4$ (0.52 g, 14.0 mmol, 1.5 equiv.) was added in small portions to this solution. After that, the reaction mixture was stirred overnight at r.t. and then poured into 150 ml of water. The product was extracted with diethyl ether (3×50 ml). The combined organic extract was washed with water, dried over Na$_2$SO$_4$ and then evaporated to dryness. The residue was dissolved in 50 ml of toluene, and a catalytic amount of TsOH was added. The resulting mixture was refluxed using Dean-Stark apparatus for 10 min, then cooled to r.t. and passed through a short pad of silica gel 60 (40-63 um). The filtrate was evaporated to dryness, the residue was dissolved in hexane, and the solution obtained was passed through a short pad of silica gel. The resulting solution was evaporated to dryness. This procedure afforded 1.60 g (57%) of the title compound as white solid.

$^1$H NMR (400 MHz, CDCl$_3$): δ 7.66-7.68 (m, 1H), 7.32-7.34 (m, 1H), 7.24 (t, 2H, J=7.6 Hz), 7.04-7.11 (m, 3H), 6.67 (s, 1H), 6.54-6.56 (m, 1H), 5.25 (s, 1H), 2.36-2.46 (m, 1H), 1.24 (d, 3H, J=6.9 Hz), 1.15 (d, 3H, J=6.9 Hz).

1-(2-(1H-Inden-2-yl)phenyl)-2-isopropyl-1H-indene (L157)

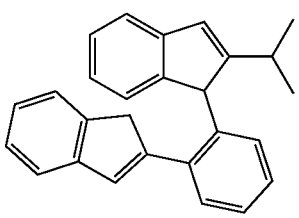 [SMILES: CC(C)C1=Cc2ccccc2C1c1ccccc1C1=Cc2ccccc2C1]

A mixture of 1-(2-bromophenyl)-2-isopropyl-1H-indene (0.90 g, 2.90 mmol, 1.0 equiv), 2-(1H-inden-2-yl)-4,4,5,5-tetramethyl-1,3,2-dioxaborolane (0.77 g, 3.20 mmol, 1.1 equiv), sodium carbonate (0.77 g, 7.30 mmol, 2.5 equiv), tetrakis(triphenylphosphine)palladium (0.17 g, 0.14 mmol, 0.05 equiv), 12 ml of toluene, 6 ml of ethanol and 3 ml of water was stirred at 100° C. overnight. After cooling to r.t., water (20 ml) was added and the mixture was extracted with ethyl acetate (3×30 ml). The combined extracts were dried over Na$_2$SO$_4$ and evaporated in vacuum. Column chromatography on silica gel 60 (40-63 um, eluent: hexane/dichloromethane=10:1, vol.) afforded 0.63 g (63%) of the title product as a yellowish solid.

$^1$H NMR (400 MHz, CDCl$_3$): δ 7.53 (d, 1H, J=7.2 Hz), 7.41-7.44 (m, 2H), 7.30-7.34 (m, 2H), 7.22-7.26 (m, 4H), 7.06-7.13 (m, 3H), 6.60 (s, 1H), 6.55 (d, 1H, J=7.7 Hz), 5.10 (s, 1H), 3.75-4.11 (AB quartet, 2H), 2.26-2.37 (m, 1H), 1.16 (d, 3H, J=6.7 Hz), 0.93 (d, 3H, J=6.9 Hz).

2-(2-(2-Isopropyl-1H-inden-1-yl)phenyl)-1,3-dimethyl-1H-indene (L158)

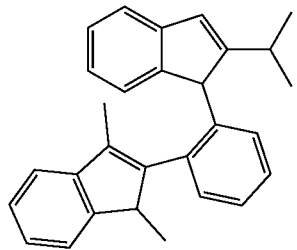 [SMILES: CC1=C(c2ccccc2C2C(C(C)C)=Cc3ccccc32)C(C)c2ccccc21]

A mixture of 1-(2-bromophenyl)-2-isopropyl-1H-indene (2.00 g, 6.40 mmol, 1.0 equiv), 2-(1,3-dimethyl-1H-inden-2-yl)-4,4,5,5-tetramethyl-1,3,2-dioxaborolane (1.90 g, 7.00 mmol, 1.1 equiv), sodium carbonate (1.70 g, 16.0 mmol, 2.5 equiv), tetrakis(triphenylphosphine)palladium (0.37 g, 0.32 mmol, 0.05 equiv), 25 ml of toluene, 12 ml of ethanol and 6 ml of water was stirred at 100° C. overnight. After cooling to r.t., water (20 ml) was added and the mixture was extracted with ethyl acetate (3×50 ml). The combined extracts were dried over Na$_2$SO$_4$ and evaporated in vacuum. Column chromatography on silica gel 60 (40-63 um, eluent: hexane/dichloromethane=20:1, vol.) afforded 0.27 g (11%) of the title product as a yellowish solid.

$^1$H NMR (400 MHz, CDCl$_3$, mixture of 2 isomers): δ 7.06-7.47 (m), 6.98 (s), 6.64 (s), 6.58 (d), 6.54 (s), 6.50 (d), 4.67 (s), 4.59 (s), 3.86-4.07 (m), 2.43-2.53 (m), 2.22 (s), 2.08 (s), 1.36 (d), 1.30 (d), 1.11-1.18 (m), 0.91 (d).

2-Isopropyl-1-(2-(3-phenyl-1H-inden-2-yl)phenyl)-1H-indene (L179)

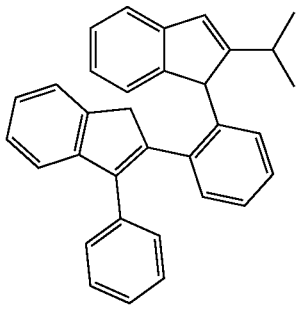 [SMILES: CC(C)C1=Cc2ccccc2C1c1ccccc1C1=C(c2ccccc2)c2ccccc2C1]

A mixture of 1-(2-bromophenyl)-2-isopropyl-1H-indene (2.10 g, 6.70 mmol, 1.0 equiv), 4,4,5,5-tetramethyl-2-(3-phenyl-1H-inden-2-yl)-1,3,2-dioxaborolane (2.35 g, 7.40 mmol, 1.1 equiv), sodium carbonate (1.70 g, 17.0 mmol, 2.5 equiv), tetrakis(triphenylphosphine)palladium (0.39 g, 0.34 mmol, 0.05 equiv), 25 ml of toluene, 12 ml of ethanol and 6 ml of water was stirred at 100° C. overnight. After cooling to r.t., water (20 ml) was added and the mixture was extracted with ethyl acetate (3×50 ml). The combined extracts were dried over Na$_2$SO$_4$ and evaporated in vacuum. Column chromatography on silica gel 60 (40-63 um, eluent: hexane/dichloromethane=10:1, vol) afforded 1.00 g (36%) of the title product as a yellowish solid.

$^1$H NMR (400 MHz, CDCl$_3$): δ 7.58 (d, 1H, J=7.3 Hz), 7.49 (d, 1H, J=7.9 Hz), 7.26-7.42 (m, 8H), 7.18-7.23 (m, 2H), 7.11 (t, 1H, J=7.3 Hz), 7.02 (td, 1H, J=7.6 Hz, J=1.4 Hz), 6.79 (td, 1H, J=7.5 Hz, J=1.1 Hz), 6.44 (s, 1H), 6.31 (dd, 1H, J=8.0 Hz, J=1.0 Hz), 5.79 (br.s, 1H), 4.64 (s, 1H), 3.99 (AB quartet, 2H), 1.98-2.09 (m, 1H), 0.96 (d, 3H, J=6.8 Hz), 0.87 (d, 3H, J=6.9 Hz).

4,4,5,5-Tetramethyl-2-(2-(2-methyl-1H-inden-1-yl)phenyl)-1,3,2-dioxaborolane

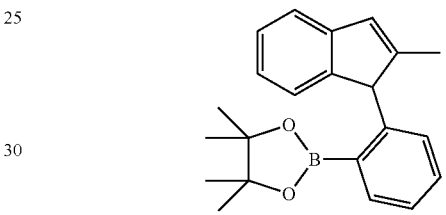

PdCl$_2$ (0.22 g, 1.20 mmol, 0.05 equiv.) and PPh$_3$ (0.65 g, 2.50 mmol, 0.1 equiv.) were added to 160 ml of dry THF, and the mixture was stirred overnight at 60° C. 1-(2-Bromophenyl)-2-methyl-1H-indene (7.00 g, 24.6 mmol, 1.0 equiv.), bis(pinacolato)diboron (6.86 g, 27.0 mmol, 1.1 equiv.), and KOAc (7.23 g, 73.8 mmol, 3.0 equiv.) were added therein, and the resulting mixture was stirred at 60° C. overnight and then poured into 300 ml of water. The product was extracted with ether (3×100 ml). The combined organic extract was dried over Na$_2$SO$_4$ and evaporated to dryness. Purification of the residue by flash chromatography on silica gel 60 (40-63 urn, eluent: hexane/dichloromethane=10:1, vol.) afforded 4.50 g (55%) of the title compound as yellow oil.

$^1$H NMR (600 MHz, CDCl$_3$): δ 7.88-7.90 (m, 1H), 7.27 (d, 1H, J=7.4 Hz), 7.18-7.21 (m, 3H), 7.11 (d, 1H, J=7.2 Hz), 7.03 (td, 1H, J=7.4 Hz, J=1.0 Hz), 6.55 (br.s, 1H), 6.48-6.51 (m, 1H), 5.44 (s, 1H), 1.91 (s, 3H), 1.38 (s, 6H), 1.37 (s, 6H).

2-(2-(2-Methyl-1H-inden-1-yl)phenyl)-1,3-diphenyl-1H-indene (L182)

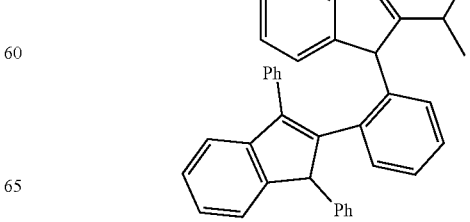

A mixture of 4,4,5,5-tetramethyl-2-(2-(2-methyl-1H-inden-1-yl)phenyl)-1,3,2-dioxaborolane (2.00 g, 6.00 mmol, 1.0 equiv), 2-bromo-1,3-diphenyl-1H-indene [synthesized as described in EP1264835A1] (2.09 g, 6.00 mmol, 1.0 equiv), cesium carbonate (4.89 g, 15.0 mmol, 2.5 equiv), tetrakis(triphenylphosphine)palladium (0.35 g, 0.30 mmol, 0.05 equiv) and 30 ml of dry dioxane was stirred at 100° C. overnight. After cooling to r.t., water (20 ml) was added and the mixture was extracted with ethyl acetate (3×50 ml). The combined extracts were dried over $Na_2SO_4$ and evaporated in vacuum. Column chromatography on silica gel 60 (40-63 urn, eluent: hexane/dichloromethane=4:1, vol.) afforded 0.80 g (29%) of the title product as a yellowish solid.

$^1$H NMR (400 MHz, $CDCl_3$, mixture of isomers): δ 7.27-7.47 (m), 6.96-7.22 (m), 6.75 (d), 6.71 (d), 6.53 (d), 4.70 (s), 4.66 (s), 3.38-3.50 (m), 1.82 (s), 1.52 (s).

General Procedure A. Complexes

To a solution of a bridged ligand (1.0 equiv) in dry THF (15 ml/mmol), n-butyllithium (2.0 equiv) was added dropwise at −80° C. and the mixture was stirred at r.t. for 1 h. Then, $Zr(NMe_2)_2Cl_2(THF)_2$ (1.0 equiv) was added at −80° C. and the resulting mixture was allowed to warm slowly to r.t. and then stirred overnight. The mixture was evaporated to dryness, the residue was taken up in toluene (5 ml/mmol), and the obtained mixture was evaporated to dryness to remove traces of THF. The residue was dissolved in toluene (5 ml/mmol), the resulting solution was filtered through a pad of Celite 503. The filtrate was placed into a glass heavy wall pressure vessel and $Me_2SiCl_2$ (5.0 equiv) was added in one portion. The resulting mixture was stirred at 60° C. for 24 h. After cooling to r.t., the mixture was filtered through a pad of Celite 503 and the filtrate was evaporated to dryness. The residue was purified by recrystallization.

Catalyst ID 140

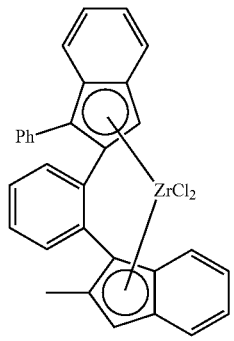

According to the General procedure A, 0.63 g (32%) of the title compound (pure single isomer, syn-orientation of the methyl and phenyl groups) were obtained from 2-methyl-1-(2-(3-phenyl-1H-inden-2-yl)phenyl)-1H-indene, (L140; 1.40 g, 3.53 mmol, 1.0 equiv), n-butyllithium (2.9 ml, 7.11 mmol, 2.0 equiv), $Zr(NMe_2)_2Cl_2(THF)_2$ (1.40 g, 3.53 mmol, 1.0 equiv) and $Me_2SiCl_2$ (2.27 g, 17.6 mmol, 5.0 equiv) after isolation of the crude product by recrystallization as follows. The crude product was dissolved in 50 ml of toluene, and 20 ml of hexane were added. The mixture was then filtered, and the filtrate was evaporated in vacuum to dryness. The residue was redissolved in 20 ml of toluene, and 30 ml of hexane was added. The precipitate formed was filtered and redissolved in 40 ml of hot toluene. The obtained solution was left overnight at r.t., then filtered, and the filtrate was evaporated in vacuum until formation of precipitate started (~30 ml). The mixture was left overnight at r.t., the precipitate formed was filtered, washed with toluene and dried in vacuum. Thus, the first crop of the product was obtained. The filtrate was concentrated in vacuum to ~10 ml and left overnight. The precipitate formed was filtered, washed with toluene and dried in vacuum to give the second crop of the product. The two crops were combined and dried in vacuum for 1 h at 50° C. The product contained 0.5 equiv. of toluene according to $^1$H NMR spectrum.

$^1$H NMR (400 MHz, $CDCl_3$): δ 7.89 (d, 1H, J=8.6 Hz), 7.78 (m, 2H), 7.59-7.70 (m, 2H), 7.56 (td, 1H, J=7.5 Hz, J=1.5 Hz), 7.46-7.50 (d, 2H), 7.46-7.42 (m, 2H), 7.07-7.37 (m, 9H+5H in toluene), 6.64 (s, 1H), 6.11 (s, 1H), 2.37 (s, 3H in toluene) 1.58 (s, 3H).

Catalyst ID 157

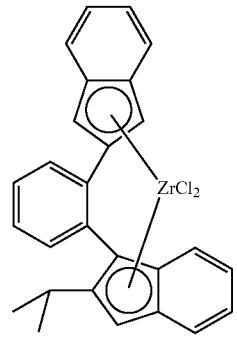

According to the General procedure A, 0.85 g (56%) of the title compound were obtained from 1-(2-(1H-inden-2-yl)phenyl)-2-isopropyl-1H-indene, (L157; 1.05 g, 3.00 mmol, 1.0 equiv), n-butyllithium (2.46 ml, 6.00 mmol, 2.0 equiv), $Zr(NMe_2)_2Cl_2(THF)_2$ (1.20 g, 3.00 mmol, 1.0 equiv) and $Me_2SiCl_2$ (1.91 g, 15.0 mmol, 5.0 equiv) after recrystallization of the crude product from 40 ml of toluene.

$^1$H NMR (400 MHz, $CDCl_3$): δ 7.49-7.57 (m, 4H), 7.46 (dd, 1H, J=8.7 Hz, J=0.8 Hz), 7.36-7.40 (m, 2H), 7.28-7.32 (m, 2H), 7.10-7.21 (m, 3H), 6.74 (s, 1H), 6.19-6.21 (m, 1H), 6.05-6.07 (m, 1H), 2.99-3.09 (m, 1H), 1.38 (d, 3H, J=7.0 Hz), 1.09 (d, 3H, J=6.8 Hz).

Catalyst ID 158

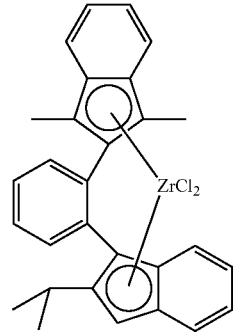

According to the General procedure A, 0.05 g (16%) of the title compound were obtained from 2-(2-(2-isopropyl-1H-inden-1-yl)phenyl)-1,3-dimethyl-1H-indene (L158; 0.23 g, 0.60 mmol, 1.0 equiv), n-butyllithium (0.50 ml, 1.20 mmol, 2.0 equiv), $Zr(NMe_2)_2Cl_2(THF)_2$ (0.24 g, 0.60 mmol, 1.0 equiv) and $Me_2SiCl_2$ (0.37 g, 3.00 mmol, 5.0 equiv) after recrystallization of the crude product from 10 ml of toluene.

$^1$H NMR (400 MHz, CDCl$_3$): δ 7.52-7.63 (m, 4H), 7.39-7.44 (m, 2H), 7.27-7.34 (m, 3H), 7.21-7.25 (m, 1H), 7.18 (dd, 1H, J=8.7 Hz, J=0.8 Hz), 7.04-7.08 (m, 1H), 6.70 (s, 1H), 2.88-2.98 (m, 1H), 2.34 (s, 3H), 2.01 (s, 3H), 1.41 (d, 3H, J=6.8 Hz), 1.11 (d, 3H, J=6.8 Hz).

Catalyst ID 179

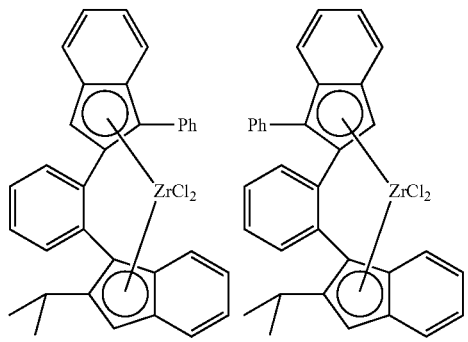

According to the General procedure A, 1.50 g (44%) of the title compound were obtained as 1:1 mixture of two isomers from 2-isopropyl-1-(2-(3-phenyl-1H-inden-2-yl)phenyl)-1H-indene (L179; 2.50 g, 5.90 mmol, 1.0 equiv), n-butyllithium (4.80 ml, 11.7 mmol, 2.0 equiv), Zr(NMe$_2$)$_2$Cl$_2$(THF)$_2$ (2.32 g, 5.90 mmol, 1.0 equiv) and Me$_2$SiCl$_2$ (3.60 g, 29.0 mmol, 5.0 equiv). Separation of isomers was conducted as follows: a portion (270 mg) of 1:1 mixture of isomers was recrystallized from 20 ml hexane-dichloromethane mixture (5:1, vol.) to afford 50 mg of pure isomer 1 (syn-orientation of the isopropyl and phenyl groups). The mother liquor was evaporated to 10 ml and the precipitate was filtered off (a mixture of isomers according to $^1$H NMR). The filtrate was evaporated to dryness and the resulting solid was recrystallized from 10 ml of hexane to afford 35 mg of pure isomer 2 (anti-orientation of the isopropyl and phenyl groups).

$^1$H NMR (400 MHz, CDCl$_3$, isomer 1): δ 7.86 (dd, 1H, J=8.7 Hz, J=0.8 Hz), 7.81-7.84 (m, 2H), 7.70-7.72 (m, 1H), 7.62 (td, 1H, J=7.5 Hz, J=1.3 Hz), 7.56 (td, 1H, J=7.5 Hz, J=1.4 Hz), 7.47-7.52 (m, 1H), 7.44 (d, 1H, J=9.4 Hz), 7.29-7.37 (m, 5H), 7.21-7.26 (m, 2H), 7.02-7.09 (m, 2H), 6.72 (s, 1H), 5.93 (s, 1H), 1.64-1.74 (m, 1H), 0.98 (d, 3H, J=6.7 Hz), 0.75 (d, 3H, J=6.9 Hz).

$^1$H NMR (400 MHz, CDCl$_3$, isomer 2): δ 7.64 (d, 2H, J=9.2 Hz), 7.50-7.57 (m, 3H), 7.45 (d, 1H, J=8.7 Hz), 7.17-7.36 (m, 9H), 6.67-6.71 (m, 2H), 6.28 (s, 1H), 6.16 (d, 1H, J=8.5 Hz), 2.86-2.97 (m, 1H), 1.40 (d, 3H, J=6.9 Hz), 1.04 (d, 3H, J=6.9 Hz).

Catalyst ID 182

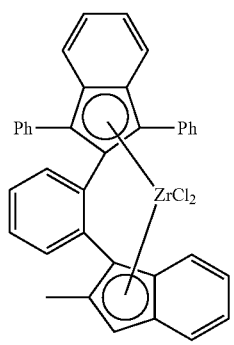

According to the General procedure A, 0.12 g (11%) of the title compound were obtained from 2-(2-(2-methyl-1H-inden-1-yl)phenyl)-1,3-diphenyl-1H-indene (L182; 0.80 g, 1.70 mmol, 1.0 equiv), n-butyllithium (1.40 ml, 3.40 mmol, 2.0 equiv), Zr(NMe$_2$)$_2$Cl$_2$(THF)$_2$ (0.67 g, 1.70 mmol, 1.0 equiv) and Me$_2$SiCl$_2$ (1.06 g, 8.50 mmol, 5.0 equiv) after recrystallization of the crude product from 20 ml of toluene and washing the resulting crystals with diethyl ether.

$^1$H NMR (400 MHz, CDCl$_3$): δ 8.13 (d, 1H, J=7.9 Hz), 8.04 (d, 2H, J=7.5 Hz), 7.94 (d, 1H, J=8.4 Hz), 7.65-7.71 (m, 2H), 7.48-7.54 (m, 3H), 7.41 (d, 1H, J=8.5 Hz), 7.17-7.36 (m, 9H), 7.14 (d, 1H, J=7.8 Hz), 6.64 (s, 1H), 6.52-6.56 (m, 1H), 5.83 (d, 1H, J=8.5 Hz), 1.47 (s, 3H).

Polymerizations

The polymerisations were carried out in a PPR48 Parallel Pressure Reactor (PPR) for olefin polymerisation. This equipment, containing 48 reactors mounted in a triple glove-box, was sold commercially by the company Symyx, thereafter by the company Freeslate. The applied polymerisation protocols were as follows:

Prior to the execution of a library, the 48 PPR cells (reactors) undergo 'bake-and-purge' cycles overnight (8 h at 90-140° C. with intermittent dry N$_2$ flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-4.0 mL), 1-hexene (in the range 0.05-2.0 mL) and MAO solution (100 µL of 0.1 mol L-1 in toluene), thermostated at 80° C., and brought to the operating pressure of 550 kPa (65 psig) with ethylene. At this point, the catalyst injection sequence is started; proper volumes of a toluene 'chaser', a solution of the precatalyst in toluene (typically in the range 0.005-0.05 mmol L-1), and a toluene 'buffer' are uptaken into the slurry needle, and then injected into the cell of destination. The reaction is left to proceed under stirring (800 rpm) at constant temperature and pressure with continuous feed of ethylene for 5-60 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

GPC Analysis

GPC curves are recorded with a Freeslate Rapid GPC setup, equipped with a set of 2 mixed-bed Agilent PLgel 10 µm columns and a Polymer Char IR4 detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg mL-1 of 4-methyl-2,6-di-tert-butylphenol (BHT) as a stabilizer, so as to obtain solutions at a concentration of 0.5 to 1.0 mg mL-1. After 2-4 h at 150° C. under gentle stirring to ensure complete dissolution, the samples are transferred to a thermostated bay at 145° C., and sequentially injected into the system at 145° C. and a flow rate of 1.0 mL min-1. In post-trigger delay operation mode, the analysis time is 12.5 min per sample. Calibration is carried out with the universal method, using 10 monodisperse polystyrene samples (Mn between 1.3 and 3700 KDa). Before and after each campaign, samples from a known i-PP batch produced with an ansa-zirconocene catalyst are analyzed for a consistency check.

NMR Characterizations

13C NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-d2 (0.6 mL), added with 0.40 mg mL-1 of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI_WALTZ16_32 by Bruker).

The catalyst activity is indicated by Rp, the calculated polymerisation rate, expressed as kilograms of copolymer, produced per mmol of catalyst per mol of ethylene in the reactor-diluent per hour [kg/(mmol$_{cat}$·[C$_2$H$_4$]·h)].

The hexene (C6) reactivity (in mol %/vol %) is expressed as mol percent hexene-incorporation in the copolymer (C6 inc., in mol %) per volume percent 1-hexene in the reaction diluent (C6, in vol %). This reactivity is the averaged value of the polymerisation runs. Obviously, a higher hexene-incorporation per volume percent in the reaction-medium indicates a higher hexene reactivity.

The weight average molecular weight is expressed in kiloDaltons (kDa)

The catalysts that were employed in the PPR polymerisation experiments are presented in table 1 below.

TABLE 1

| Catalyst ID | 4 | 1 | 135 |
|---|---|---|---|
| Molecular structure | 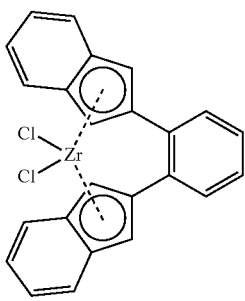 | | |

| Catalyst ID | 140 | 158 | 157 |
|---|---|---|---|
| Molecular structure | 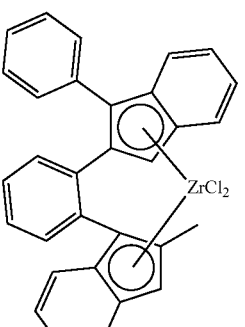 | | |

TABLE 1-continued

| Cat ID | 179 | 182 |
|---|---|---|
| Molecular structure | 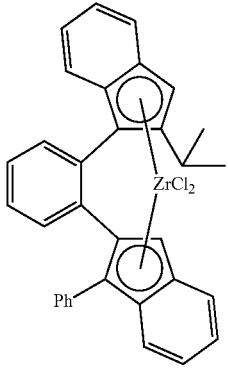 | 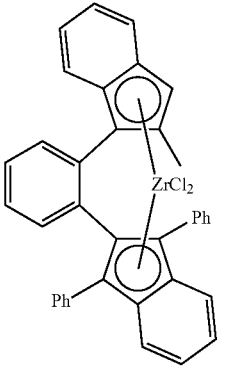 |

The experimental results are summarized in Table 2

TABLE 2

| Experiment | Cat | C6 [vol %] | Rp[kg/ (mmol$_{cat}$ · [C$_2$H$_4$] · h)] | Mw [kDa] | MWD [—] | C6 inc [mol %] | C6 react [mol %/ vol %] |
|---|---|---|---|---|---|---|---|
| A | 4 | 0 | 1026 | — | — | — | |
|   |   | 10 | 641 | 8 | 2 | 0.8 | 0.08 |
|   |   | 50 | 140 | — | — | 4.3 | |
| B | 1 | 0 | 724 | — | — | — | |
|   |   | 10 | 478 | 386 | 2.9 | 1 | 0.1 |
|   |   | 40 | 160 | 222 | 3 | 4.1 | |
| C | 135 | 0 | 517 | — | — | — | |
|   |   | 5 | 233 | 267 | 4 | 1.4 | 0.3 |
|   |   | 10 | 152 | 183 | 4.7 | 3.1 | |
| D | 140 | 0 | 836 | — | — | — | |
|   |   | 2 | 645 | 346 | 2.2 | 1.5 | 0.7 |
|   |   | 10 | 307 | 214 | 2.8 | 6.0 | |
| E | 158 | 0 | 2290 | — | — | — | |
|   |   | 2 | 460 | 144 | 2.1 | 2.6 | 1.2 |
|   |   | 10 | 830 | 73 | 2.1 | 11.2 | |
| F | 157 | 0 | 930 | — | — | — | |
|   |   | 2 | 860 | 161 | 2.0 | 2.7 | 1.4 |
|   |   | 10 | 850 | 78 | 2.1 | 14.5 | |
| G | 179 | 0 | 5 | — | — | — | |
|   |   | 2 | 60 | 159 | 2.5 | 2.9 | 1.3 |
|   |   | 10 | 5 | 92 | 2.5 | 11.2 | |
| H | 182 | 0 | 2 | — | — | — | |
|   |   | 2 | 20 | 143 | 2.3 | 2.3 | 1.1 |
|   |   | 10 | 2 | 73 | 2.1 | 10.9 | |

Experiment A is comparative and reflects example III.5 of U.S. Pat. No. 6,342,622; Experiment B also is comparative and reflects example VIII.4 of U.S. Pat. No. 6,342,622; Experiment C also is comparative. Experiments D through H are experiments according to the present invention.

Table 2 illustrates that when using a 1,2-phenylene bridge between two 2-indenyl moieties (Catalyst complex 4) as described in U.S. Pat. No. 6,342,622, the molecular weight and the hexene-reactivity are very low. When replacing the 1,2-phenylene bridge by a 2,2'-biphenylene bridge between two 2-indenyl moieties (Catalyst complex 1), the molecular weight is increased, but the hexene-reactivity remains low. When replacing one 2-indenyl moiety by a 1-indenyl moiety as in (Catalyst complex 135), the molecular weight remains high, but although there is an improvement in the hexene-reactivity, this reactivity still requires improvement. Surprisingly, when compounds according to the invention are used, the hexene-reactivity is drastically increased while maintaining high molecular weight.

The invention claimed is:

1. A process for the preparation of olefin polymers, the process comprising: polymerising a mixture of ethylene and at least one other α-olefin of 3 or more carbon atoms in the presence of a metallocene complex according to formula I forming an ethylene-olefin copolymer, wherein the metallocene complex optionally is immobilized on a support,

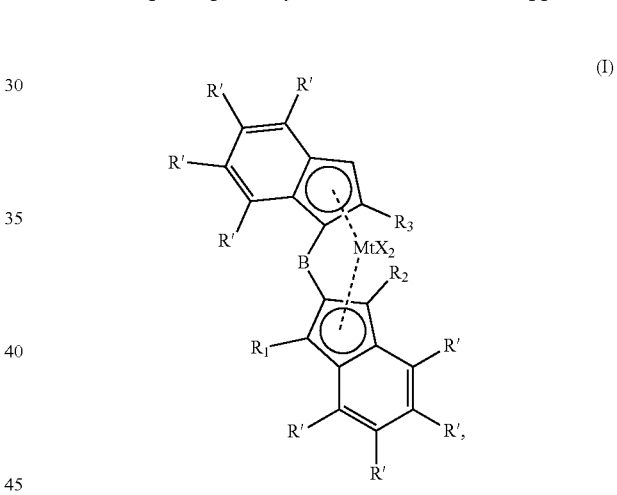

wherein
R$_1$ and R$_2$ are independently selected from H, a methyl, ethyl, n-propyl or iso-propyl group, a butyl group, a hexyl group, a cyclohexyl group, or a phenyl group,
R$_3$ is a methyl, ethyl, n-propyl or iso-propyl group,
R' is selected from H, an alkyl group, or an aryl group, and wherein different R' substituents are optionally connected to form a ring structure,
B is a 1,2-phenylene bridge,
Mt is Zr, X is a methyl group, Cl, Br or I, z is the number of X groups and equals the valence of Mt minus 2.

2. The process according to claim 1, wherein the at least one other α-olefin of 3 or more carbon atoms is chosen from 1-butene, 1-hexene, 1-octene, vinyl-cyclohexane, or 4-methyl-1-pentene.

3. The process according to claim 1, wherein the at least one other α-olefin of 3 or more carbon atoms is 1-hexene.

4. The process according to claim 1, wherein the at least one other α-olefin of 3 or more carbon atoms is present in an amount of about 5 to about 50 percent by weight in an ethylene-α-olefin copolymer formed by polymerising the mixture.

5. The process according to claim 4, wherein the at least one other α-olefin of 3 or more carbon atoms is present in an amount of about 5 to about 40 percent by weight in the ethylene-olefin copolymer.

6. The process according to claim 1, wherein the ethylene and the at least one other α-olefin of 3 or more carbon atoms are polymerized in the presence of the metallocene complex of formula I and a cocatalyst.

7. The process according to claim 6, wherein the cocatalyst includes aluminium- or boron-containing cocatalysts.

8. The process according to claim 1, wherein Mt is Zr, X is Cl, and z is 2.

9. The process according to claim 1, wherein in formula I of the metallocene complex, $R_1$ and $R_2$ are chosen from H, methyl or phenyl groups.

10. The process according to claim 1, wherein in formula I of the metallocene complex, $R_3$ is chosen from a methyl or isopropyl group.

11. The process according to claim 1, wherein in formula I of the metallocene complex,
   Mt is zirconium;
   X is a methyl group, Cl, Br or I;
   $R_1$ and $R_2$ are chosen from H, methyl or phenyl groups;
   $R_3$ is chosen from a methyl or isopropyl group;
   the bridge B is a 1,2 phenylene bridge; and
   R' is hydrogen.

12. The process according to claim 11, wherein Mt is Zr, X is Cl, and z is 2.

* * * * *